United States Patent
Augustsson (10) Patent No.: US 7,330,658 B2
(45) Date of Patent: Feb. 12, 2008

(54) DEVICE AND METHOD FOR OPTICAL ADD/DROP MULTIPLEXING

(75) Inventor: Torsten Augustsson, Upplands Väsby (SE)

(73) Assignee: Telefonaktiebolaget LM Ericssom (publ), Stockholm (SE)

( * ) Notice: Subject to any disclaimer, the term of this patent is extended or adjusted under 35 U.S.C. 154(b) by 704 days.

(21) Appl. No.: 10/239,410

(22) PCT Filed: Mar. 20, 2001

(86) PCT No.: PCT/SE01/00574

§ 371 (c)(1),
(2), (4) Date: Jan. 21, 2003

(87) PCT Pub. No.: WO01/73994

PCT Pub. Date: Oct. 4, 2001

(65) Prior Publication Data

US 2004/0037563 A1    Feb. 26, 2004

(30) Foreign Application Priority Data

Mar. 24, 2000   (SE)   .................................. 0001050

(51) Int. Cl.
*H04J 14/02*  (2006.01)
(52) U.S. Cl. ..................................................... 398/84
(58) Field of Classification Search ............. 398/84–87
See application file for complete search history.

(56) References Cited

U.S. PATENT DOCUMENTS 6,005,992 A * 12/1999 Augustsson et al. .......... 385/16

6,351,581 B1 * 2/2002 Doerr et al. ................... 385/24

OTHER PUBLICATIONS

T. Augustsson, "Bragg Grating Assisted MMIMI Coupler for Wavelength Selective Switching," Electronics Letters, vol. 34, No. 25, pp. 2416-2418, Dec. 1998.

T. Augustsson, "Bragg Grating-Asited MMI-Coupler for Add-Drop Multiplexing," Journal of Lightwave Technology, vol. 16, No. 8, pp. 1517-1522, Aug. 1998.

J-M. Jouanno et al., "Low Crosstalk Planar Optical Add-Drop Multiplexer Fabricated with UV-Induced Bragg Gratings," Electronics Letters, vol. 33, No. 25, pp. 2120-2121,Dec. 1997.

Jean-Pierre Weber et al., "A New Type of Tunable Demultiplexer using a Multi-leg Mach-Zehnder Interferometer," Ericsson Components AB, Microelectronics Division, pp. 1-4.

J.-M. Jouanno, et al., "Low Crosstalk Optical Add-Drop Multiplexer based on a Planar Silica-on-Silicon Mach-Zehnder Interferometer with UV-induced Bragg Gratings and UV-Trimming," Mikroelecktronik Centret, Technical University of Denmark, pp. 259-261.

(Continued)

*Primary Examiner*—Shi K Li
(74) *Attorney, Agent, or Firm*—Nixon & Vanderhye P.C.

(57) ABSTRACT

An optical add/drop multiplexing (OADM) device includes two MMI structures connected by a MI/MZI waveguide structure comprising a wavelength selector that includes phase shifted Bragg gratings. The OADM multiplexer transmits a wavelength channel selected in advance and reflects all other channels to achieve a drop functionality. Simultaneously, a further channel may be added to the multiplexer at the same side as the channel selected in advance is output. The further channel preferably is centered around the same wavelength as the channel selected in advance. The further channel is transmitted through the Bragg gratings and is superimposed with the other channels to achieve an add functionality.

28 Claims, 3 Drawing Sheets

OTHER PUBLICATIONS

Lucas B. Soldano et al., "Optical Multi-Mode Interference Devices Based on Self-Imaging: Principles and Applications," Journal of Lightwave Technology, vol. 13, No. 4, pp. 615-627, Apr. 1995.

Govind P. Agrawal et al., "Phase-Shifted Fiber Bragg Gratings and their Application for Wavelength Demultiplexing," IEEE Photonics Technology Letters, vol. 6, No. 8, pp. 995-997, Aug. 1994.

* cited by examiner

DEVICE AND METHOD FOR OPTICAL ADD/DROP MULTIPLEXING

This application is the U.S. national phase of international application PCT/SE01/00574 filed 20 Mar. 2001, which designated the U.S. and claims priority to SE 0001050-4 filed 24 Mar. 2000.

TECHNICAL FIELD

The present invention relates to optical transmission techniques, particularly single mode integrated optics, for tele and data communication. Specifically, the invention relates to a device and a method for optical wavelength selective so-called add/drop multiplexing.

DESCRIPTION OF RELATED ART AND BACKGROUND OF THE INVENTION

In order to increase the capacity on an optical transmission line (point-to-point connection) or in an optical network (multipoint-to-multipoint connection) there are today several known techniques. One of these comprises utilizing wavelength division multiplexing (WDM) of transmission channels to enhance the utilization of bandwidth in a network, which, however, requires access to devices capable of multiplexing and demultiplexing transmission channels, which are transmitted at different so-called optical carrier wavelength in the network.

One kind of multiplexing is so-called add/drop multiplexing, which means that a wavelength channel or channel group either is added to a multiplex (add function) or dropped from a multiplex (drop function). Known devices for add/drop multiplexing comprises i.a. the following.

A multiplexer device provided with Bragg gratings and based on a MZI-structure (MZI, Mach-Zehnder interferometer) is described in Low Crosstalk Optical Add-Drop Multiplexer based on a Planar Silica-On-Silicon Mach-Zehnder Interferometer with UV-induced Bragg Gratings and UV-Trimming, J.-M. Jouanno et al, Tech. Dig. Bragg Gratings, Photosensitivity, and Poling in Glass Fibers and Waveguides; Applications and Fundamentals, OSA, 1997, Williamsburg, Va. pages 259-261. In principle a complete add/drop multiplexer may be achieved by such a device, which comprises two directional couplers interconnected by interferometer legs, a co-called MZI-structure, even if it is most likely in practice that two separate devices are required to achieve complete add/drop functionality. Alternatively, two Bragg gratings having equal Bragg wavelengths may be cascaded in each Mach-Zehnder leg. Further, coupling to so-called cladding modes in the grating structures may occur, which leads to deteriorated performance of the device, particularly for channels whose carrier wavelengths are shorter than the Bragg wavelength.

A wavelength selective tunable device, denoted MM/MZI demultiplexer, (MM/MZI, multimode interference Mach-Zehnder interferometer) can be used for wavelength selective switching, see for instance the publication A new type of tunable demultiplexer using a multi-leg Mach-Zehnder interferometer, J.-P. Weber et al, Proc. ECIO '97 EthE5, Stockholm, pages 272-275, 1997. Cascading of two such devices may result in a complete tunable add/drop multiplexer. Such a multiplexer, however, has a very narrow region where the crosstalk performance is good (low crosstalk), which in a straightly principle way is possible to consider, but in such instance very complexed interference circuits are required to achieve non-linear phase response in the Mach-Zehnder legs of the multiplexer. Further, interference problems may occur for transmitted channels when two MMIMZI devices are cascaded.

A wavelength selective device based on an MMIMIBg structure (MMIMIBg, Bragg grating assisted multimode interference Michelson interferometer), which provides for completely individual switching, is depicted in Bragg grating assisted MMIMI coupler for wavelength selective switching, T. Augustsson, Electron. Lett., volume 34(35), pages 2416-2418, 1998. Even if the theory of the technique indicates low crosstalk, e.g. process dependent tolerance variation effects may come to increase the crosstalk. The MMIMIBg device is probably particularly sensitive for variable losses as regards crosstalk since it is based on reflection in long Michelson interferometer legs. Possibly, two separate devices are required to achieve complete add/drop functionality. Further, it has not yet been experimentally shown that such a device having acceptable performance may be realized.

An MMI based device provided with Bragg gratings is shown in the paper Bragg Grating-Assisted MMI coupler for Add-Drop Multiplexing, T. Augustsson, J. Lighwave Tehnol., volume 16(8), pages 1517-1522, 1998. However, it is difficult to achieve such a device which can handle a channel separation below 400 GHz with good filter performance.

Problems of the above mentioned known techniques comprise thus a long propagation distance for the light through the respective device, which gives rise to power losses and risk of instabilities. Further, known techniques may involve severe problems as regards channel crosstalk and interference effects. The devices, which have good performance, are relatively complicated and thus relatively difficult and costly to realize.

SUMMARY OF THE INVENTION

It is an object of the present invention to provide a device for optical add/drop multiplexing of a wavelength multiplexed optical signal comprising a plurality of optical wavelength channels, which can exhibit enhanced performance.

It is in this respect a particular object of the invention to provide such a device for add/drop multiplexing, which can exhibit better filter profiles and lower channel crosstalk than multiplexers according to prior art.

It is a further object of the invention to provide a device for add/drop multiplexing, which can be designed more compact and thereby minimize the propagation distances for optical signals through the same.

It is yet a further object of the invention to provide a device for add/drop multiplexing, which during use exhibits low power losses and has a stable transmission performance.

Further objects of the present invention will be apparent in the detailed description below.

The above said objects are attained according to a first aspect of the present invention by a device for optical add/drop multiplexing (OADM), which comprises two MMI structures connected by a waveguide structure comprising wavelength selective means, particularly phase shifted Bragg gratings or lowpass and highpass Bragg gratings, in combination, so that the OADM multiplexer transmits a wavelength channel selected in advance and reflects all other channels. Simultaneously, a new channel may be added to the multiplexer at the same side as the channel selected in advance is output, wherein said new channel is preferably centered around the same wavelength as the channel selected in advance, whereby the new channel is transmitted through the Bragg gratings and is superimposed with the other channels.

More in detail, a device for optical add/drop multiplexing of a wavelength multiplexed optical signal comprising a plurality of wavelength channels, $\lambda_1, \lambda_2, \ldots, \lambda_n$, is provided, said device comprising:

a first MMI coupler comprising an input, an output and MI/MZI ports, and arranged for receiving the multiplexed signal at said input, for splitting the multiplexed signal into components, and for imaging these components at said MI/MZI ports;

waveguides and wavelength selective means, wherein the waveguides are arranged for receiving and transporting the components imaged at the MI/MZI ports of the first MMI coupler and the wavelength selective means are arranged for transmission of the components received and transported by the waveguides, which combined constitute a first, $\lambda_i$, of said plurality of wavelength channels, and reflection of components received and transported by the waveguides, which combined constitute the other, $\lambda_1, \lambda_2, \ldots, \lambda_{i-1}, \lambda_{i+1}, \ldots, \lambda_n$, of said plurality of wavelength channels; and a second MMI coupler comprising two MI/MZI ports and an output and arranged for receiving the components transmitted through the wavelength selective means, which combined constitute the first, $\lambda_i$, of said plurality of wavelength channels, at said MI/MZI ports of said second MMI coupler, and for combining these received components such that they are imaged at the output of said second MMI coupler; wherein the first MMI coupler is further arranged for receiving the components reflected by the wavelength selective means, which combined constitute the other, $\lambda_1, \lambda_2, \ldots, \lambda_{i-1}, \lambda_{i+1}, \ldots, \lambda_n$, of said plurality of wavelength channels, at the MI/MZI ports of said first MMI coupler, and for combining these received components such that they are imaged at the output of said first MMI coupler.

It is a further object of the present invention to provide a method for add/drop multiplexing of above said kind.

This object is attained according to a second aspect of the present invention by a method for optical add/drop multiplexing of a wavelength multiplexed optical signal comprising a plurality of wavelength channels, $\lambda_1, \lambda_2, \ldots, \lambda_n$, which method comprises the steps of:

inputting the multiplexed signal at an input of a first MMI coupler and splitting the multiplexed signal into components in said first MMI coupler, wherein these components are imaged at MI/MZI ports of said first MMI coupler;

inputting and transporting the components imaged at the MI/MZI ports of the first MMI coupler in waveguides;

transmitting said components input and transported in the waveguides, which combined constitute a first $\lambda_i$ of said plurality of wavelength channels through wavelength selective means;

reflecting the other $\lambda_1, \lambda_2, \ldots, \lambda_{i-1}, \lambda_{i+1}, \ldots, \lambda_n$ of said plurality of wavelength channels input and transported in the waveguides at said wavelength selective means;

inputting the components transmitted through the wavelength selective means, which together constitute the first $\lambda_i$ of said plurality of wavelength channels, at MI/MZI ports of a second MMI coupler and combining these components in said second MMI coupler such that they are imaged at an output of said second MMI coupler; and inputting the components reflected at the wavelength selective means, which combined constitute the other $\lambda_1, \lambda_2, \ldots, \lambda_{i-1}, \lambda_{i+1}, \ldots, \lambda_n$ of said plurality of wavelength channels at the MI/MZI ports of the first MMI coupler, combining these components in said first MMI coupler and imaging them at an output of the first MMI coupler.

Advantages of the add/drop multiplexer according to the present invention are principally that it is compact and thereby provides for short propagation distances for all channels but the add/drop channels. In this respect lower losses and stability against temperature gradients are obtained.

SHORT DESCRIPTION OF THE DRAWINGS

The invention is described closer below with reference to the appended drawings, which are shown only to illustrate the invention, and shall therefore in no way limit the same.

PREFERRED EMBODIMENTS

In the following description, with depicting and not limiting purposes, specific details are set forth, such as particular applications, techniques, methods etc to obtain a thorough understanding of the present invention. It shall, however, be appreciated for the man skilled in the art that the invention may be practised in other embodiments that deviate from these specific details. In other instances detailed descriptions of well-known methods, devices or circuits are omitted so as not to obscure the description of the present invention with unnecessary details.

The present invention comprises a new and inventive device for add/drop multiplexing of a wavelength multiplexed optical signal comprising a plurality of wavelength channels. The device comprises two MMI couplers connected by two waveguides comprising wavelength selective means for channel filtering. The wavelength selective means, which preferably are constituted by Bragg gratings, particularly phase shifted Bragg gratings, and preferably Bragg gratings having three phase shifts of $\pi/2$, are arranged for transmission of the add/drop channel and for reflection of the other channels. Hereby the wavequide structure works as a Mach-zehnder interferometer (MZI) for the add/drop channel and as an Michelson interferometer (MI) for the other channels, which results in short propagation distances through the multiplexer for the majority of the channels.

The wavelength selective device may comprise i.a. the following basic components:

Waveguide based Michelson interferometers and Mach-Zehnder interferometers are used to realize an interference component for e.g. filtering.

An MMI waveguide structure (MMI, multimode interference) is used for the splitting of light. Theory of these may be found e.g. in L. B. Soldano and E. C. M. Pennings, Optical Multi-Mode Interference Devices Based on Self-Imaging:

Principles and Application, J. Lightwave Technol., volume 13(4), pages 615-627, 1995, and in references therein.

MMI splitting of light results in a multiple image of the incident intensity distribution. The length/width ratio of the MMI structure determines the number of images at its output, said images having a certain determined mutual phase relation, depending on the input at which the light is excited.

A Bragg grating is used for filtering and reflection of light. The filter profile may be modulated by the strength, length and variable period (grating wavelength), i.e. so-called chirp, of the grating. The strength and the period may be varied in the propagation direction of light. Such variation of the strength is denoted apodization. In the present invention the kind of Bragg grating, which reflects a wide spectral band (many wavelength channels), is utilized. This may be achieved by using a very strong grating or a chirped grating or a combination thereof.

A more thorough description of Bragg gratings for wavelength demultiplexing is found i.a. in G. P. Agrawal and S. Radic, Phase-shifted Fiber Gratings and their Application for Wavelength Demultiplexing, IEEE Photon. Tech. Lett., volume 6(8), pages 995-997, August 1994, and in references therein.

A phase adjustment element, which typically is used for offering switching capabilities, is in the present invention particularly usable for correcting for imperfections during manufacture of the inventive device. The basic of a phase adjustment element is that the optical path length is affected by an externally applied signal (voltage, current etc). The most likely best way to adjust the phase for this purpose is to use a thermo-optical element, i.e. affect the refractive index (and thereby the optical path length) in the waveguides by means of temperature. Some waveguides are also capable of being affected in a similar way by means of applying an electrical field over the waveguide, i.e. the refractive index is affected electro-optically. If a permanent adjustment is sufficient UV trimming may be performed, at least for the material system $SiO_2/Si$.

Figure 1A:
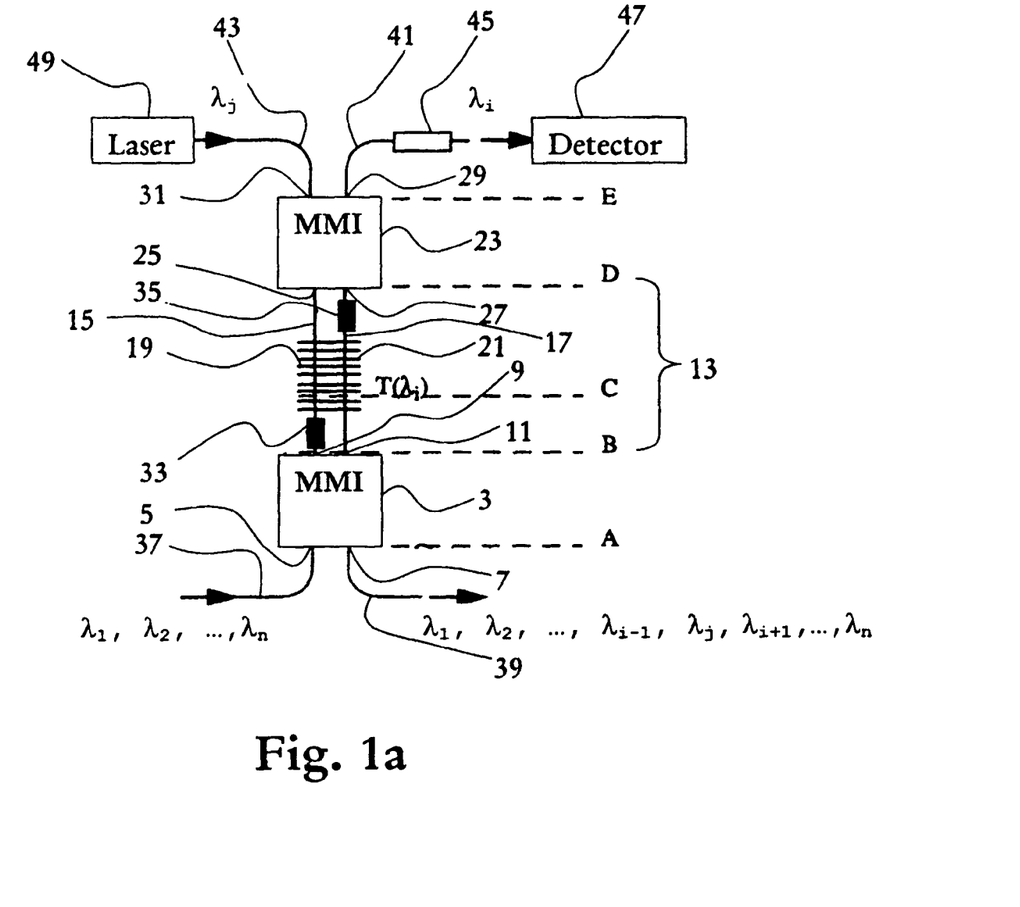
FIG. 1a illustrates schematically a device for add/drop multiplexing of a wavelength selective optical signal according to a first embodiment of the present invention.

With reference now to FIG. 1a, which schematically illustrates a device for add/drop multiplexing of a wavelength multiplexed optical signal, a first embodiment of the present invention will be described. The device comprises a first 2×2 MMI structure or coupler 3, having two ports 5, 7 at a first side or interface A and two ports 9, 11 at an oppositely located second side or interface B. Port 5 is an input port for inputting a wavelength multiplexed optical signal transmitted in an access waveguide 37, said signal comprising n wavelength channels $\lambda_1, \lambda_2, \ldots, \lambda_n$, where n is a positive integer and where each channel is centered around a respective wavelength.

MMI coupler 3 has a length/width ratio so that a suitable number (two in the present embodiment) of images of incident light distribution are achieved at interface B. An approximative equation, which describes this relation for a N×N MMI coupler is:

$$L \approx (M/N)(4nW^2/\lambda)$$

where L is the length of the MMI waveguide, W is its effective width, $\lambda$ is the wavelength of the light (the centre wavelength for the wavelength multiplex), n is the so-called effective index of the MMI waveguide (index for the MMI waveguide if a transformation from a 3 to a 2 dimensional consideration is made), N is the number of images and M is an integer (normally M=1 is chosen). For further details in this respect reference is made to above mentioned article by Soldano and Pennings.

In the present embodiment MMI coupler 3 is designed such that two images of the incident signal multiplex $\lambda_1, \lambda_2, \ldots, \lambda_n$ are formed at respective ports 9 and 11. At these ports a waveguide structure 13 is arranged, comprising two waveguides 15, 17, each provided with a phase shifted Bragg grating 19, 21, at the position indicated by C in FIG. 1a. The waveguides 15, 17 are optically connected to ports 9 and 11, also denoted MI/MZI ports, for further propagation of the respective signal image or signal component.

The Bragg gratings are designed such that a wavelength channel $\lambda_i$ (or more correctly the components which combined constitute $\lambda_i$) is transmitted through the gratings and the other channels $\lambda_1, \lambda_2, \ldots, \lambda_{i-1}, \lambda_{i+1}, \ldots, \lambda_n$ in the multiplex (or more correctly the components which combined constitute them) are reflected back towards MMI coupler 3.

The transmitted wavelength channel $\lambda_i$ (the components that combined constitute it) propagates towards a second MMI coupler 23 comprising two MI/MZI ports 25, 27 at a first side or interface D, which ports 25, 27 are optically connected to the waveguides 15, 17, said second MMI coupler 23 further comprising two ports 29, 31 at an oppositely located second side or interface E. The MMI coupler 23 is arranged such that the components, which are input at ports 29, 31 are combined and imaged at port or output 29. An access waveguide 41 is optically connected to this output such that wavelength channel $\lambda_i$ can be output from the multiplexer. In such a way a wavelength channel $\lambda_i$ (or group of channels) can be demultiplexed from the multiplex (drop functionality) for further transport to a detector 47. The access waveguide 41 may be provided with a bandpass filter 45 for further enhanced signal/background (S/B) ratios.

The reflected wavelength channels $\lambda_1, \lambda_2, \ldots, \lambda_{i-1}, \lambda_{i+1}, \ldots, \lambda_n$ (or more correctly the components which combined constitute them) propagate back towards MMI coupler 3, and are input in the same at MI/MZI ports 25, 27. The functionality (reciprocal function) of the MMI coupler is such that these components are combined and are imaged at port or output 7. An access waveguide 39 is optically connected to this output so that the remaining multiplex (the wavelength channels $\lambda_1, \lambda_2, \ldots, \lambda_{i-1}, \lambda_{i+1}, \ldots, \lambda_n$) can be output from the multiplexer for further transmission.

Further, an access waveguide 43 is optically connected to the input 31 of the second MMI coupler and in this respect an optical wavelength channel $\lambda_j$ may be input into the multiplexer through this port. Preferably, channels $\lambda_i$ and $\lambda_j$ are centered around the same wavelength so that it is only the information carried by the channels that differs.

Wavelength channel $\lambda_j$ is divided in MMI coupler 23 into two components which are imaged at ports 25, 27, which components are input in waveguides 15, 17 are transmitted through Bragg gratings 19, 21 and are input into MMI coupler 3 via ports 9, 11, similar to the wavelength channels $\lambda_1, \lambda_2, \ldots, \lambda_{i-1}, \lambda_{i+1}, \ldots, \lambda_n$. Thus the components are combined and are imaged at port or output 7. Channel $\lambda_j$ is output into access waveguide 39 together with the remaining multiplex (the wavelength channels $\lambda_1, \lambda_2, \ldots, \lambda_{i-1}, \lambda_{i+1}, \ldots, \lambda_n$). In such manner a wavelength channel $\lambda_j$ (or group of channels) can be added to the multiplex (add functionality).

Further, the multiplexer may be provided with a phase adjustment means 33 for adjustment of the phase of all wavelength channels ($\lambda_1, \lambda_2, \ldots, \lambda_n, \lambda_j$). This phase adjustment means is arranged at one of the waveguides in the waveguide structure 13, preferably between the first MMI coupler 3 and the Bragg gratings 19, 21. A further phase adjustment means 35 for adjustment of the phase of the channels $\lambda_i$ and $\lambda_j$ may be arranged at one of the waveguides in the waveguide structure 13, particularly between the Bragg gratings 19, 21 and the second MMI coupler 23.

These phase adjustment means may comprise thermo-optical or electro-optical elements where the phase can be controlled, but comprise preferably UV trimming elements for permanent adjustment. The phase adjustment means are principally used to compensate for variations in geometries and doping levels which often arise during manufacture of optical waveguides.

Figure 1B:
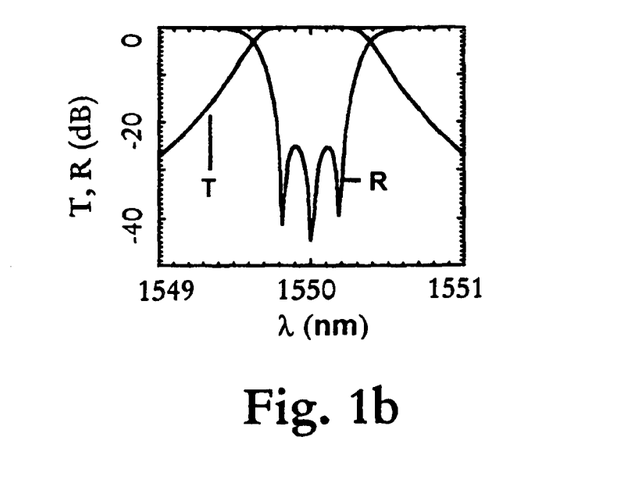
FIG. 1b shows example of frequency dependent transmission and reflection characteristics of a Bragg grating comprised in the device of FIG. 1a, said Bragg grating being phase shifted by three phase shifts of $\pi/2$.

In FIG. 1b an example of frequency dependent transmission and reflection characteristics for a phase shifted Bragg grating comprised in the device as shown in FIG. 1a, is shown, said Bragg grating having three phase shifts of $\pi/2$. The positions of the phase shift determine the filter characteristics.

Figure 2:
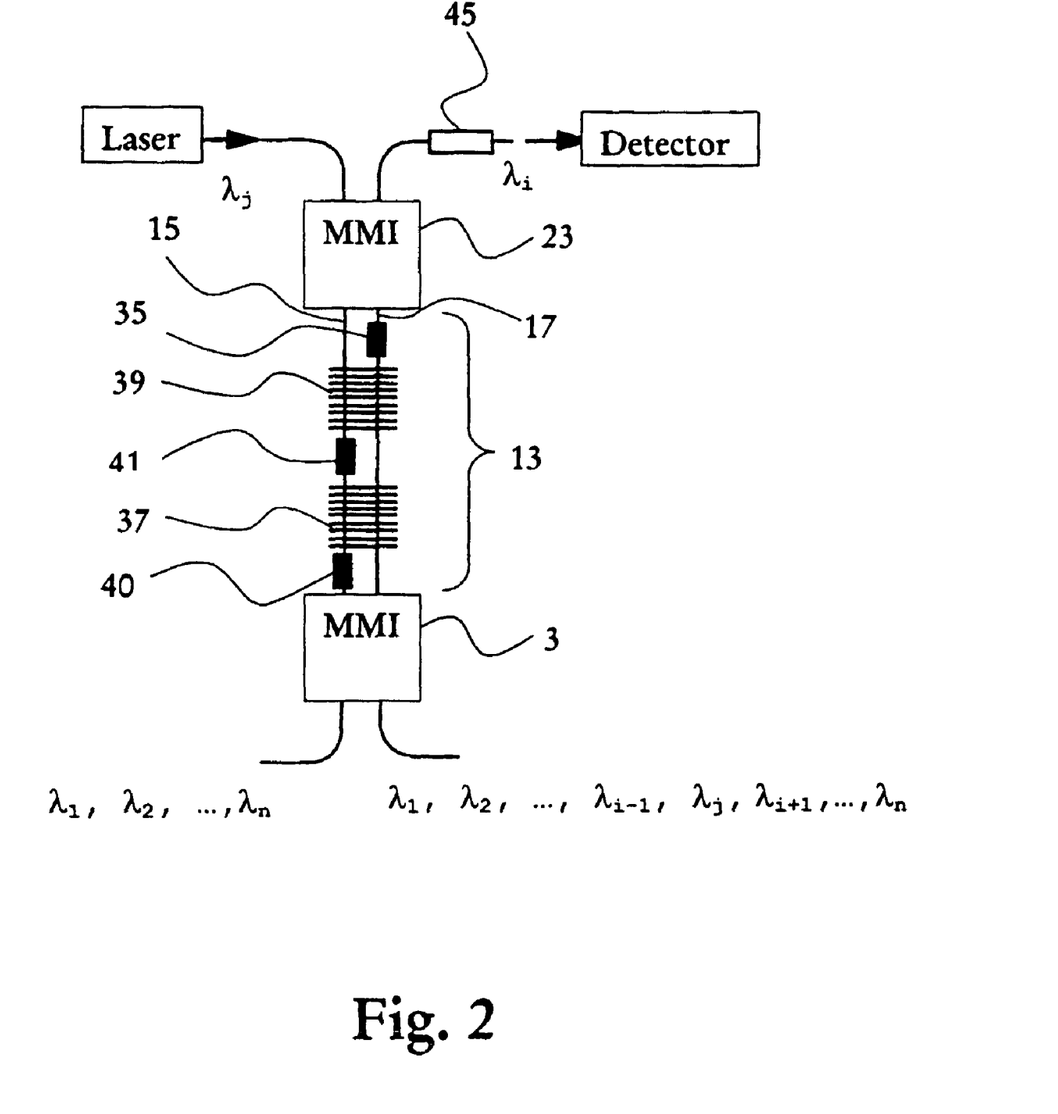
FIG. 2 illustrates schematically a device for add/drop multiplexing of a wavelength multiplexed optical signal according to a second embodiment of the present invention.

Next, with reference to FIG. 2, which schematically illustrates yet a device for add/drop multiplexing of a wavelength multiplexed optical signal, a second embodiment of the present invention will be described. The device is identical with the device of FIG. 1a, except for the design of waveguide structure 13. In this embodiment the waveguide structure 13 comprises two waveguides 15, 17 provided on one hand with lowpass Bragg gratings 37 and on the other hand with highpass Bragg gratings 39 which together attain a function (bandpass filtering), similar to that of the phase shifted Bragg gratings 19 and 21 of FIG. 1a. The phase adjustment means 35 for adjustment of the phase of the channels $\lambda_i$ and $\lambda_j$ exists also in this embodiment, while the phase adjustment means 33 is replaced by two phase adjustment means 40 and 41. Phase adjustment means 40 is arranged between the first MMI coupler 3 and the lowpass Bragg gratings 37 and thus affects the phase of all wavelength channels, while phase adjustment means 41 is arranged between the lowpass Bragg gratings 37 and the highpass Bragg gratings 39 and thus affects the phase of the wavelength channels that are transmitted through Bragg gratings 37.

Figure 3:
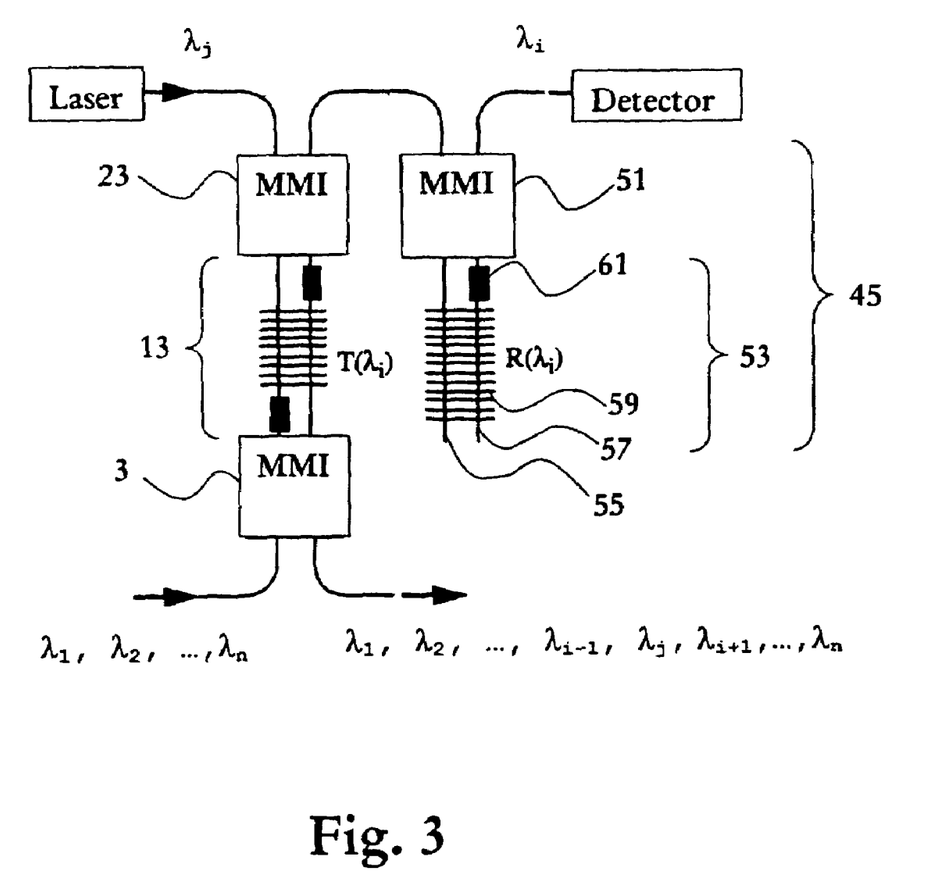
FIG. 3 illustrates schematically a device for add/drop multiplexing of a wavelength multiplexed optical signal according to a third embodiment of the present invention.

Finally, with reference to FIG. 3, which schematically illustrates yet a device for add/drop multiplexing of a wavelength multiplexed optical signal, a third embodiment of the present invention will be described. The device is identical with the device of FIG. 1a, except of that the bandpass filter 45 here is designed in detail as an MMI based Michelson interferometer structure comprising an MMI coupler 51 connected to an MMI waveguide structure 53 comprising two waveguides 55 and 57 provided with Bragg gratings 59, said Bragg gratings having a filter characteristic such that the dropped channel is reflected by the Bragg gratings and other wavelengths are transmitted through the gratings. In this respect the signal performance may be further enhanced. Possibly, one of the waveguides may be provided with the phase adjustment means, for instance a UV trimming element, to compensate for parameter variations during manufacture of the structure as explained above.

The invention, as herein described, enables a more compact solution, especially for multiplexing/demultiplexing using short wavelength distances between the channels, which may provide advantages as regards performance (principally as regards filter profile and crosstalk). The compact structure allows for possibilities to reduce the losses and the power consumption in comparison with known add/drop multiplexers. Further a stable performance is achieved when the plurality of channels have short propagation distances through the multiplexer.

The invention is of course not limited to the above described and on the drawings illustrated embodiments, but can be modified within the scope of the appended claims. Particularly, the invention is apparently not limited as regards material choice, dimensions or manufacture of the device.

It shall be appreciated that the add/drop multiplexer according to the present invention also may be used for demultiplexing of an optical signal comprising a plurality of channels into two separated signals, wherein each signal comprises multiple channels.

It shall further be appreciated that the add/drop multiplexer is completely reciprocal and has thus an equivalent functionality i the reverse direction.

The invention claimed is:

1. A device for optical add/drop multiplexing of a wavelength multiplexed optical signal comprising a plurality of wavelength channels comprising:
   a first MMI coupler comprising an input, an output and MI/MZI ports, and arranged for receiving the multiplexed signal at said input, for splitting the multiplexed signal into components, and for imaging these components at said MI/MZI ports;
   waveguides and wavelength selective means, wherein the waveguides are arranged for receiving and transporting the components imaged at the MI/MZI ports of the first MMI coupler and the wavelength selective means are arranged for transmission of the components received and transported by the waveguides, which combined constitute a first of said plurality of wavelength channels, and reflection of components received and transported by the waveguides, which combined constitute the other of said plurality of wavelength channels; and
   a second MMI coupler comprising two MI/MZI ports and an output and arranged for receiving the components transmitted through the wavelength selective means, which combined constitute the first of said plurality of wavelength channels, at said MI/MZI ports of said second MMI coupler, and for combining of these received components such that they are imaged at the output of said second MMI coupler; wherein
   the first MMI coupler is further arranged for receiving the components reflected by the wavelength selective means which combined constitute the other of said plurality of wavelength channels, at the MI/MZI ports of said first MMI coupler, and for combining these received components such that they are imaged at the output of said first MMI coupler.

2. The device as claimed in claim 1, wherein
   the second MMI coupler comprises an input and is arranged for receiving a further wavelength channel at its input, for splitting this further wavelength channel into components, and for imaging these components at the MI/MZI ports of said second MMI coupler;

the waveguides are arranged for receiving and transporting the components imaged at the MI/MZI ports of the second MMI coupler;

the wavelength selective means are arranged for transmission of components input and transported in the waveguides, which combined constitute said further wavelength channel; and the first MMI coupler is arranged for receiving the components transmitted through the wavelength selective means, which combined constitute said further wavelength channel, at the MI/MZI ports of said first MMI coupler, and for combining these received components such that they are imaged, together with the components, which combined constitute the other of said plurality of wavelength channels, at the output of said first MMI coupler.

3. The device as claimed in claim 2, wherein the wavelength selective means are comprised of Bragg gratings.

4. The device as claimed in claim 3, wherein the Bragg gratings are phase shifted.

5. The device as claimed in claim 4, wherein the Bragg gratings comprise three phase shifts of $\pi/2$.

6. The device as claimed in claim 4, wherein the Bragg gratings comprises at least four phase shifts of $\pi/2$.

7. The device as claimed in claim 3, wherein at least one of the waveguides is provided with a phase adjustment means for adjustment of the phase of all wavelength channels, where said phase adjustment means is located between the first MMI coupler and the Bragg gratings.

8. The device as claimed in claim 7, wherein a first group of the Bragg gratings is arranged for lowpass filtering and a second group of the Bragg gratings is arranged for highpass filtering.

9. The device as claimed in claim 8, wherein the Bragg gratings are chirped.

10. The device as claimed in claim 8, wherein at least one of the waveguides is provided with a phase adjustment for adjustment of the phase of all wavelength channels, where said phase adjustment means is located between the first MMI coupler and the Bragg gratings, and provided with a phase adjustment for adjustment of the phase of the wavelength channels transmitted through the Bragg gratings arranged for lowpass filtering, where said phase adjustment means is located between the first and the second group of the Bragg gratings.

11. The device as claimed in any of claim 2, wherein at least one of the waveguides is provided with a phase adjustment means for adjustment of the phase of the first of said plurality of wavelength channels, where said phase adjustment means is located between the wavelength selective means and the second MMI coupler.

12. The device as claimed in any of claim 2, wherein at least one of the waveguides is provided with a phase adjustment means for adjustment of phase of the further wavelength channel, where said phase adjustment means is located between the wavelength selective means and the second MMI coupler.

13. The device as claimed in any of claim 2, wherein it comprises a first access waveguide optically connected to the input of the first MMI coupler, a second access waveguide optically connected to the output of the first MMI coupler, a third access waveguide optically connected to the output of the second MMI coupler, and a fourth access waveguide optically connected to the input of the second MMI coupler.

14. The device as claimed in claim 13, wherein each of the access waveguides is comprised of a monomode waveguide.

15. The device as claimed in claim 13, wherein the third access waveguide, which is optically connected to the output of the second MMI coupler, is provided with a bandpass filter for filtering of the first of said plurality of wavelength channels.

16. The device as claimed in claim 15, wherein said bandpass filter is comprised of a MMI-based Michelson interferometer structure.

17. The device as claimed in any of claim 2, wherein the first of said plurality of wavelength channels and the further wavelength channel are centered around the same wavelength.

18. The device as claimed in any of claim 1, wherein each MMI coupler is of the size 2×2.

19. A method for optical add/drop multiplexing of a wavelength multiplexed optical signal comprising a plurality of wavelength channels comprising:

inputting the multiplexed signal at an input of a first MMI coupler and splitting the multiplexed signal into components in said first MMI coupler, wherein these components are imaged at MI/MZI ports of said first MMI coupler;

inputting and transporting the components imaged at the MI/MZI ports of the first MMI coupler in waveguides;

transmitting said components input and transported in the waveguides, which combined constitute a first of said plurality of wavelength channels through wavelength selective means;

reflecting the other of said plurality of wavelength channels input and transported in the waveguides at said wavelength selective means;

inputting the components transmitted through the wavelength selective means, which together constitute the first of said plurality of wavelength channels, at MI/MZI ports of a second MMI coupler, combining these components in said second MMI coupler and imaging them at an output of said second MMI coupler; and inputting the components reflected at the wavelength selective means, which combined constitute the other of said plurality of wavelength channels at the MI/MZI ports of the first MMI coupler, combining them in said first MMI coupler and imaging them at an output of the first MMI coupler.

20. The method as claimed in claim 19, comprising:

inputting a further wavelength channel at an input of the second MMI coupler and dividing said further channel into components in said second MMI coupler, wherein these components are imaged at the MI/MZI ports of said second MMI coupler;

inputting the components imaged at the MI/MZI ports of the second MMI coupler and transporting the components in the waveguides;

transmitting the components input and transported in the waveguides, which combined constitute said further wavelength channel, through the wavelength selective means; and inputting the components transmitted through the wavelength selective means, which combined constitute said further wavelength channel, through the MI/MZI ports of the first MMI coupler, combining and imaging these components together with the components, which combined constitute the other of said plurality of wavelength channels, at the output of said first MMI coupler.

21. The method as claimed in claim 20, wherein
the multiplexed signal is transported to the input of the first MMI coupler in a first access waveguide, which is optically connected to the input of the first MMI coupler;
the further wavelength and the other of said plurality of wavelength channels are output in a second access waveguide, which is optically connected to the output of the first MMI coupler;
the first of said plurality of wavelength channels is output in a third access wavequide, which is optically connected to the output of the second MMI coupler; and
the further wavelength channel is transported to the input of the second MMI coupler in a fourth access waveguide, which is optically connected to the input of the second MMI coupler.

22. The method as claimed in claim 21, wherein the first of said plurality of wavelength channels, which is output in the third access waveguide, thereafter is bandpass filtered.

23. The method as claimed in claim 22, wherein the first of said plurality of wavelength channels is bandpass filtered by an MMI based Michelson interferometer structure.

24. The method as claimed in claim 19, wherein all access waveguides are comprised of monomode waveguides.

25. The method as claimed in claim 19, wherein the wavelength selective means are comprised of Bragg gratings.

26. The method as claimed in claim 25, wherein the Bragg gratings are phase shifted.

27. The method as claimed in claim 19, wherein the phase of the first of said plurality of wavelength channels is adjusted by means of an adjustment means arranged between the first and the second MMI coupler.

28. The method as claimed in claim 19, wherein the phase of the other of said plurality of wavelength channels are adjusted by means of at least one phase adjustment means arranged between the first and the second MMI coupler.

* * * * *